(12) United States Patent  
Schneider et al.

(10) Patent No.: US 8,974,105 B2  
(45) Date of Patent: Mar. 10, 2015

(54) EDGE ILLUMINATION OF AN ION-EXCHANGED GLASS SHEET

(71) Applicant: Corning Incorporated, Corning, NY (US)

(72) Inventors: Vitor Marino Schneider, Painted Post, NY (US); Alana Marie Whittier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/328,238

(22) Filed: Jul. 10, 2014

(65) Prior Publication Data

US 2014/0321124 A1 Oct. 30, 2014

Related U.S. Application Data

(63) Continuation of application No. 13/285,616, filed on Oct. 31, 2011, now Pat. No. 8,789,998.

(60) Provisional application No. 61/529,573, filed on Aug. 31, 2011.

(51) Int. Cl.  
*F21V 7/04* (2006.01)  
*G02B 5/02* (2006.01)  
(Continued)

(52) U.S. Cl.  
CPC ............ *G02B 5/0284* (2013.01); *F25D 23/028* (2013.01); *F21W 2121/00* (2013.01);  
(Continued)

(58) Field of Classification Search  
USPC .................... 349/65; 359/599; 362/97.1, 100, 362/296.01, 330, 615, 627, 629  
See application file for complete search history.

(56) References Cited

U.S. PATENT DOCUMENTS

| 3,533,677 A | 10/1970 | Osterberg et al. ............... 350/96 |
| 4,059,338 A | 11/1977 | Hartelius, Jr. .................. 350/96 |

(Continued)

FOREIGN PATENT DOCUMENTS

| GB | 1 339 980 | 12/1973 |
| GB | 1 359 169 | 7/1974 |

(Continued)

OTHER PUBLICATIONS

H. Schröder, et al., "Out-of-Plane Coupling Using Thin Glass Based Arrayed Waveguide Components," *Proc. of SPIE*, 2009, vol. 7221, pp. 72210D-1-72210D-8.

*Primary Examiner* — Stephen F Husar  
(74) *Attorney, Agent, or Firm* — Ryan T. Hardee

(57) ABSTRACT

A planar ion-exchanged glass sheet for out-of-plane light beam coupling includes a first surface, a ion-exchanged first glass region adjacent and parallel to the first surface, a core glass region adjacent and parallel to the first glass region, a ion-exchanged second glass region adjacent and parallel to the core glass region, and a second surface adjacent and parallel to the second glass region. One edge of the glass sheet has an angled end face that is inclined to the plane extends across a thickness of at least one of the glass regions. Methods of making the planar ion-exchanged glass sheet, coupling an out-of-plane light beam into a plane using the planar ion-exchanged glass sheet, and scattering the coupled light to illuminate at least select regions of an exposed surface of the glass sheet are also disclosed.

17 Claims, 9 Drawing Sheets

(51) Int. Cl.
*F25D 23/02* (2006.01)
*G09F 13/18* (2006.01)
*F21V 8/00* (2006.01)
*F21V 13/08* (2006.01)
*F21W 121/00* (2006.01)
*F21Y 101/02* (2006.01)

(52) U.S. Cl.
CPC ............ *F21Y2101/02* (2013.01); *G09F 13/18* (2013.01); *G02B 6/0031* (2013.01); *G02B 6/0041* (2013.01); *G02B 6/0043* (2013.01); *F21V 13/08* (2013.01)
USPC ............ 362/629; 349/65; 359/599; 362/97.1; 362/330; 362/627

(56) References Cited

U.S. PATENT DOCUMENTS

| | | | |
|---|---|---|---|
| 4,653,844 A | 3/1987 | Ward | 350/96.15 |
| 5,235,589 A | 8/1993 | Yokomori et al. | 369/112 |
| 5,743,981 A | 4/1998 | Lu | 156/182 |
| 5,886,820 A | 3/1999 | Tajima et al. | 359/492 |
| 6,078,717 A | 6/2000 | Nashimoto et al. | 385/130 |
| 6,236,793 B1 | 5/2001 | Lawrence et al. | 385/132 |
| 6,385,355 B1 | 5/2002 | Nashimoto et al. | 385/8 |
| 6,825,987 B2 | 11/2004 | Repetto et al. | 359/633 |
| 6,987,906 B2 | 1/2006 | Nakama et al. | 385/31 |
| 7,665,810 B2 | 2/2010 | Crompton et al. | 312/204 |
| 8,789,998 B2 * | 7/2014 | Schneider et al. | 362/629 |
| 2004/0115352 A1 | 6/2004 | Schultheis et al. | 427/282 |
| 2005/0009198 A1 | 1/2005 | MacCraith et al. | 436/172 |
| 2005/0175286 A1 | 8/2005 | Patel et al. | 385/43 |
| 2007/0133936 A1 | 6/2007 | Sato et al. | 385/142 |
| 2009/0197048 A1 | 8/2009 | Amin et al. | 428/142 |
| 2009/0201698 A1 | 8/2009 | Klick et al. | 362/555 |
| 2010/0327720 A1 | 12/2010 | Pae | 312/405 |
| 2011/0079034 A1 | 4/2011 | Kim et al. | 62/264 |

FOREIGN PATENT DOCUMENTS

| | | |
|---|---|---|
| WO | 03/076993 | 9/2003 |
| WO | 2010/029077 | 3/2010 |

\* cited by examiner

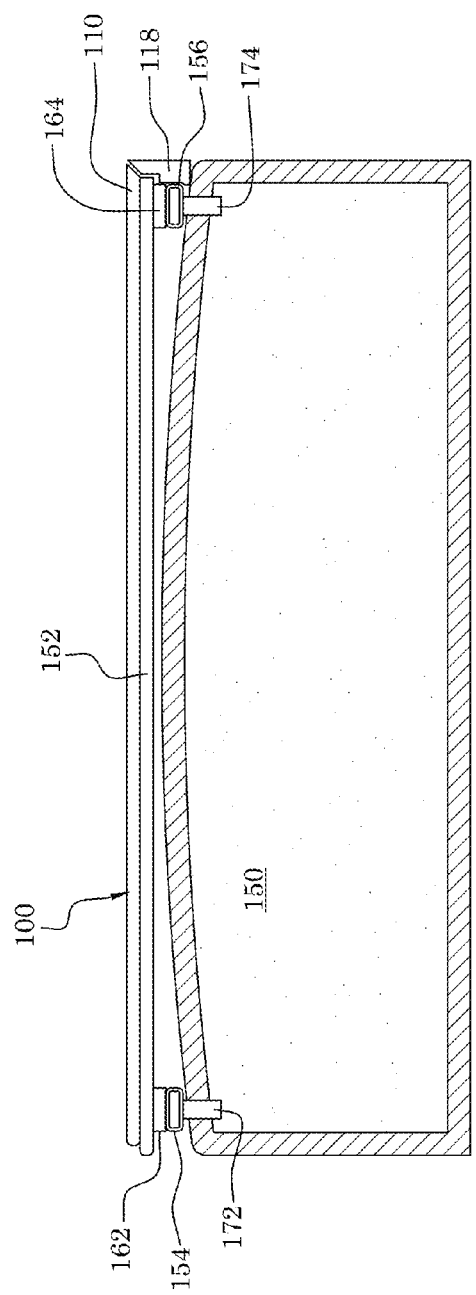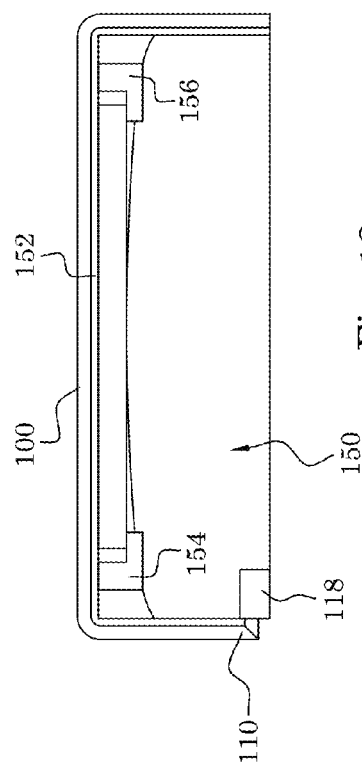

EDGE ILLUMINATION OF AN ION-EXCHANGED GLASS SHEET

CROSS-REFERENCE TO RELATED APPLICATIONS

This application is co-pending with and a continuation application of U.S. patent application Ser. No. 13/285,616 filed Oct. 31, 2011 which claims the benefit of priority under 35 U.S.C. §119 of U.S. Provisional Application Ser. No. 61/529,573 filed on Aug. 31, 2011.

TECHNICAL FIELD

The present invention relates to edge illumination of an ion-exchanged, chemically hardened glass sheet for illuminating the surface of the glass sheet, and more particularly, out-of-plane optical coupling of light into an ion-exchanged, chemically hardened glass cover or fascia for an electronic appliance or other device for creating an ornamental effect.

BACKGROUND

Glass sheets are used as protective or decorative covers or fascias for devices such as appliances, portable electronic devices, cell phones, furniture, architectural features/elements, and televisions. Glass covers are most commonly used on such devices that display or collect information through a display or touch screen. A glass cover or fascia provides an aesthetic smooth, glossy, scratch-resistant and easy to clean surface compared to current appliances fascias, such as stainless steel or polymers. The present disclosure addresses how to couple light into a plane of a glass sheet, which may be an ion-exchanged glass sheet, in order to illuminate the surface of the glass sheet. The present disclosure also address how to couple light into a plane of a glass sheet when the input beam is not aligned with the plane of the glass sheet, e.g. the light bean is "out-of-plane," in order to illuminate the glass sheet and provide an ornamental or decorative effect.

SUMMARY

In one aspect hereof, a planar ion-exchanged glass sheet with an integrated out-of-plane light beam coupling comprises a first ion-exchanged glass region that is parallel to a plane of the planar ion-exchanged glass, a core glass region beneath the first ion-exchanged glass region that is monolithic with the first ion-exchanged glass region, and a second ion-exchanged glass region beneath the core glass region that is monolithic with the core glass region. The planar ion-exchanged glass sheet further includes an angled end face that is inclined to the plane. The angled end face extends across a thickness of at least one of the glass regions and is monolithic with at least one of the glass regions.

In one embodiment, the angled end face extends across a thickness of the first ion-exchanged glass region and is monolithic with the first ion-exchanged glass region, and a glass angle between the angled end face and the plane is less than 90 degrees and greater than the arc sine of n0/n1, where n0 is the refractive index of air and n1 is the refractive index of the first ion-exchanged glass region.

In one embodiment, the angled end face extends across a thickness of the second ion-exchanged glass region and is monolithic with the second ion-exchanged glass region, and a glass angle between the angled end face and the plane is less than 90 degrees and greater than the arc sine of n0/n2, where n0 is the refractive index of air and n2 is the refractive index of the second ion-exchanged glass region.

In one embodiment, the angled end face extends across a thickness of the core glass region and is monolithic with the core glass region, and a glass angle between the angled end face and the plane is less than 90 degrees and greater than the arc sine of n0/n3, where n0 is the refractive index of air and n3 is the refractive index of the core glass region.

In one embodiment, the angled end face extends across a combined thickness of all the glass regions and is monolithic with all the glass regions, and a glass angle between the angled end face and the plane is less than 90 degrees and greater than the greatest of the arc sine of n0/1, arc sine of n0/n2, and arc sine of n0/n3, where n0 is the refractive index of air, n1 is the refractive index of the first ion-exchanged glass region, n2 is the refractive index of the second ion-exchanged glass region, and n3 is the refractive index of the core glass region.

In another aspect hereof, a planar ion-exchanged glass sheet for integrated out-of-plane light beam coupling and illumination of a surface of the glass sheet, the glass sheet comprising; a first surface. An ion-exchanged first glass region parallel and adjacent to the first surface. A core glass region parallel and adjacent to the first glass region; an ion-exchanged second glass region parallel and adjacent to the core glass region; a second surface parallel and adjacent to the second glass region. Light scattering features disposed at least one of (a) on the first surface and (b) within a volume of at least one of the glass regions; and an angled end face that is inclined to the first surface and extends across a thickness of at least one of the glass regions.

In one embodiment, the step of acquiring is performed by selecting a planar ion-exchanged glass sheet in which a glass angle between the angled end face and the plane of the planar ion-exchanged glass sheet is such the angled end face extends across a thickness of at least the one of (a) the first ion-exchanged glass region, (b) the second ion-exchanged glass region, and (c) the core glass region, and wherein a glass angle between the angled end face and the plane is less than 90 degrees and greater than at least one of the arc sine of n0/n1, where n0 is the refractive index of air and n1 is the refractive index of a corresponding one of (a) the first ion-exchanged glass region, (b) the second ion-exchanged glass region, and (c) the core glass region.

In one embodiment, the step of acquiring is performed by selecting a planar ion-exchanged glass sheet in which a glass angle between the angled end face and the plane of the planar ion-exchanged glass sheet is such the angled end face extends across a combined thickness of all the glass regions, and wherein a glass angle between the angled end face and the plane is less than 90 degrees and greater than the greatest of the arc sine of n0/n1, arc sine of n0/n2, and arc sine of n0/n3, where n0 is the refractive index of air, n1 is the refractive index of the first ion-exchanged glass region, n2 is the refractive index of the second ion-exchanged glass region, and n3 is the refractive index of the core region.

In one embodiment, a refractive index of each of the first and second ion-exchanged glass regions is different from a refractive index of the core glass region.

In one embodiment, each of the first and second ion-exchanged glass regions is in compression and the core glass region is in tension, and glass sheet has a thickness of about 2 mm or less, 1.5 mm or less, 1 mm or less, or 0.7 mm or less.

In one embodiment, a reflective layer formed on the angled end face.

In one embodiment, an anti-reflective layer formed on a surface of at least one of the first and second ion-exchanged glass regions in a position where the anti-reflective layer is in opposing relation to the angled end face.

In one embodiment, a reflective layer formed on the second surface.

In one embodiment, the light scattering particles are located or concentrated in select regions of the glass sheet, whereby when a light beam is coupled into the glass sheet a decorative pattern is illuminated on an exposed surface of the glass sheet.

In another aspect hereof, a method of illuminating an exposed surface of a glass sheet with an out-of-plane light beam is provided, where the glass sheet forms a decorative fascia on an object. The method includes the following steps. Acquiring a planar ion-exchanged glass sheet having; (i) a first surface, (ii) an ion-exchanged first glass region adjacent and parallel to the first surface, (iii) a core glass region adjacent and parallel to the first ion-exchanged glass region, (iv) an ion-exchanged second glass region adjacent and parallel to the core glass region, (v) a second surface adjacent and parallel to the second ion-exchanged glass region, (vi) light scattering features disposed at least one of (a) on the first surface and (b) within a volume of at least one of the glass regions; and (v) an angled end face that is inclined to the plane and extends across a thickness of at least one of the glass regions. Positioning an elongate light beam adjacent to the second surface in opposing relation to the angled end face. Launching the elongate light beam at the planar ion-exchanged glass so that the light beam passes through at least one of the glass regions and strikes the angled end face to produce a reflected elongate light beam that is coupled into at least one of the glass regions. Scattering at least a portion of the light coupled into at least one of the glass regions, whereby a portion of the scattered light is emitted out the exposed surface of the glass sheet and illuminates at least a portion of the exposed surface of the glass sheet.

In one embodiment, the glass sheet is a planar ion-exchanged glass sheet in which a glass angle between the angled end face and the plane of the planar ion-exchanged glass sheet is such that total internal reflection occurs at the angled end face when the elongate light beam strikes the angled end face during the step of launching.

In one embodiment, the step of scattering at least a portion of the light includes scattering the coupled light in select regions of the glass sheet more than on other regions of the glass sheet, whereby a decorative pattern is illuminated on the exposed surface of the glass sheet.

In one embodiment, the decorative pattern includes a message and the message is selectively illuminated on the occurrence of an event.

In one embodiment, the elongate light beam has a first portion having a first color aligned with the message and at least one second portion having a second color aligned with a remainder of the decorative pattern, whereby the message is illuminated in a different color than the remainder of the decorative pattern.

In one embodiment, the step of changing a color of the elongate light beam occurs on the occurrence of an event.

In one embodiment, the step of launching the elongate light beam happens on the occurrence of an event.

In one embodiment, the elongate light beam has a first portion having a first color and at least one second portion having a second color, whereby a first portion of the decorative pattern is illuminated in a different color than at least a second portion of the decorative pattern.

According to another aspect hereof, an illuminated glass fascia on an object includes: a glass sheet having: (a) a top surface and a bottom surface; (b) an ion-exchanged first glass region adjacent to the top surface of the glass sheet; (c) a core glass region beneath the first ion-exchanged glass region; (d) an ion-exchanged second glass region beneath the core glass region, adjacent to the bottom surface of the glass sheet; (e) an angled end face that is inclined to a plane of the glass sheet, extends across a thickness of at least one of the glass regions, and has an inclined inner reflecting surface inside the glass sheet facing toward the bottom surface of the glass sheet; and (f) scattering features at least one of dispersed within the glass sheet and dispersed on the top surface of the. An elongate light source is positioned adjacent to the bottom surface of the glass sheet in alignment with the angled end face to emit an elongate light beam that passes through at least one of the glass regions and strikes the reflecting surface to produce a reflected light beam that is coupled into at least one of the glass regions, whereby the reflected light beam is scattered by the scattering features and a portion of the light is emitted out the top surface of the glass sheet and illuminates the top surface of the glass sheet.

In one embodiment, the scattering particles are more concentrated in select regions of the glass sheet than in other areas of the glass sheet, whereby a decorative pattern is illuminate on the top surface of the glass sheet.

In one embodiment, the decorative pattern is at least one of a brand name, trademark or logo, or a message.

In one embodiment, the decorative pattern includes a first portion that is an ornamental design and a second portion that is at least one of a brand name, trademark or logo, or a message.

In one embodiment, the elongate light source comprises: a first elongate light source that emits a first an elongate light beam in a first color into a first portion of the glass corresponding to the first portion of the decorative pattern to illuminate the ornamental design in the first color; and a second elongate light source that emits a second elongate light beam in a second color into a second portion of the glass corresponding to the second portion of the decorative pattern to illuminate the at least one of a brand name, trademark or logo, or a message in the second color.

In one embodiment, the elongate light source emits a colored light beam that changes color in response an event.

In one embodiment, the glass fascia is mounted on a front or top surface of an electronic device.

In one embodiment, the glass fascia is mounted on the front of a door of an appliance.

In one embodiment, the elongate light source is positioned on a side of the door behind a plane of a front surface of the door.

In one embodiment, the glass sheet has a thickness of about 2 mm or less, 1.5 mm or less, 1 mm or less, or 0.7 mm or less.

In one embodiment, the glass sheet has a planar central portion and one or more rearward bend side portions, with a bend between the central portion and side portion having a radius of 5 mm or less.

In one embodiment, a refractive index of each of the first and second ion-exchanged glass regions is different from a refractive index of the core glass region, and each of the first and second ion-exchanged glass regions is in compression and the core glass region is in tension.

In one embodiment, a glass angle between the angled end face and the plane of the planar ion-exchanged glass sheet is such the angled end face extends across a thickness of at least the one of (a) the first ion-exchanged glass region, (b) the second ion-exchanged glass region, and (c) the core glass region, and wherein a glass angle between the angled end face and the plane is less than 90 degrees and greater than at least one of the arc sine of $n0/n1$, where $n0$ is the refractive index of air and n1 is the refractive index of a corresponding one of (a) the first ion-exchanged glass region, (b) the second ion-exchanged glass region, and (c) the core glass region.

In one embodiment, a glass angle between the angled end face and the plane of the planar ion-exchanged glass sheet is such the angled end face extends across a combined thickness of all the glass regions, and wherein a glass angle between the angled end face and the plane is less than 90 degrees and greater than the greatest of the arc sine of n0/n1, arc sine of n0/n2, and arc sine of n0/n3, where n0 is the refractive index of air, n1 is the refractive index of the first ion-exchanged glass region, n2 is the refractive index of the second ion-exchanged glass region, and n3 is the refractive index of the core region.

In one embodiment, a reflective layer formed on the angled end face.

In one embodiment, an anti-reflective layer formed on a surface of at least one of the first and second ion-exchanged glass regions in a position where the anti-reflective layer is in opposing relation to the angled end face.

In one embodiment, a reflective layer formed on the second surface.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 11 is a schematic top view (not to scale) of a light coupled glass sheet attached to an appliance according an aspect hereof.

FIG. 12 is a schematic top view (not to scale) of a light coupled shaped glass sheet attached to an appliance according another aspect hereof.

DETAILED DESCRIPTION

Figure 1A:
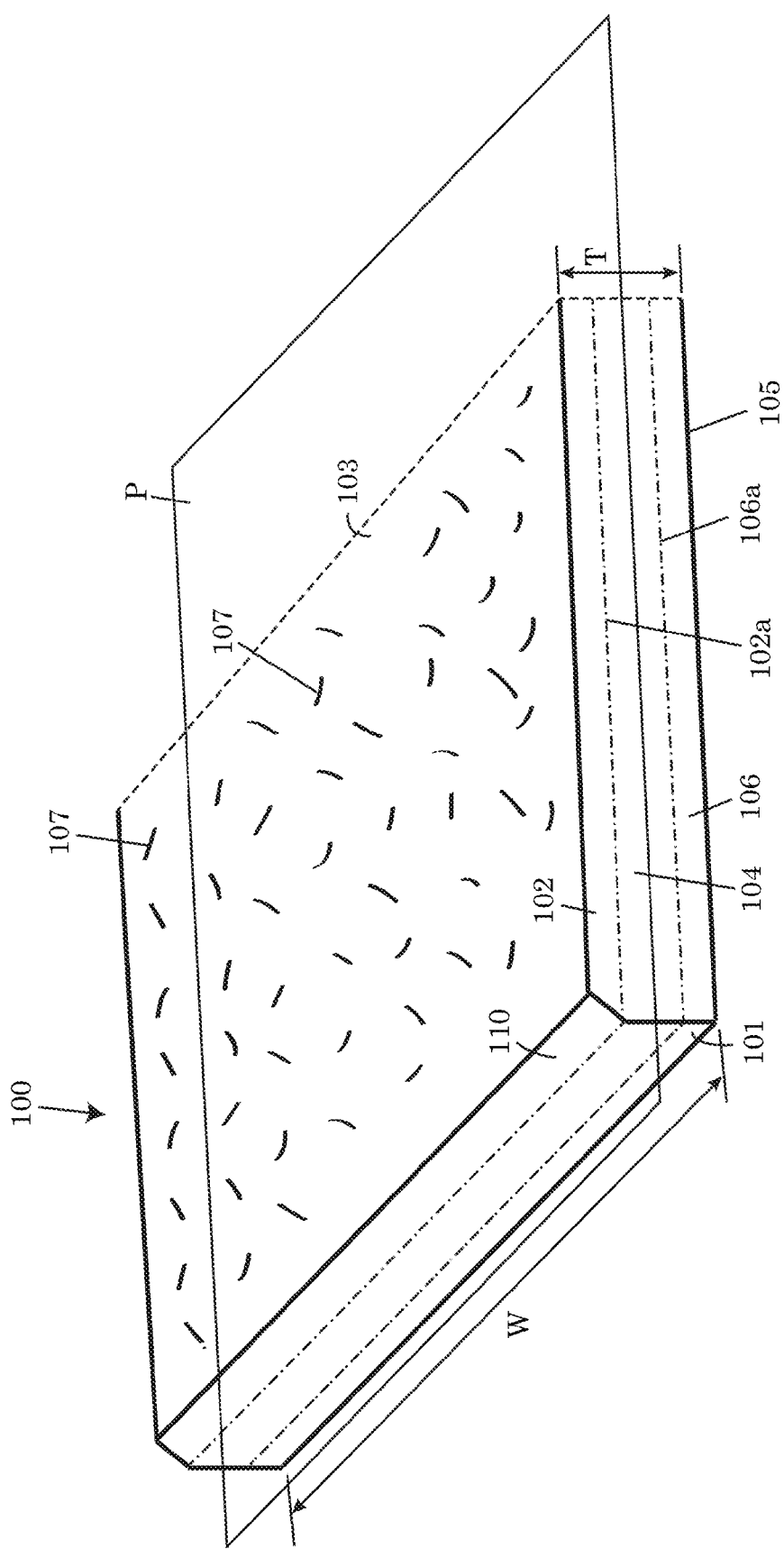
FIG. 1a is a perspective view of a planar ion-exchanged glass sheet having an angled end face for coupling an out-of-plane light beam into a plane.

In the following detailed description, numerous specific details may be set forth in order to provide a thorough understanding of embodiments of the present invention. However, it will be clear to one skilled in the art when embodiments of the present invention may be practiced without some or all of these specific details. In other instances, well-known features or processes may not be described in detail so as to focus on what is novel and non-obvious in the present invention. In addition, like or identical reference numerals may be used to identify common or similar elements.

Ion-exchanged, chemically hardened glass sheet, because of its high strength and high resistance to scratching, provides a superior protective or decorative cover for appliances and other devices. Thin ion-exchanged glass sheet is particularly suitable for use as a decorative fascia on electronic devices, such as portable devices, smart phones, televisions and smart appliances, which display or collect information through a screen. By thin it is meant a glass sheet having a thickness of 2 mm or less, or 1.5 mm or less, 1 mm or less, 0.7 mm or less, 0.5 mm to 1.5 mm, or 0.5 mm to 1 mm. The thin glass sheet provides for enhanced appearance of displays and enhanced performance of touch screens or controls located under the glass cover or fascia. A thin glass fascia also enables the seamless incorporation of touch controls and displays under the glass sheet in a clean, modern, edge to edge design. The thin ion exchanged glass sheet also provides for a lightweight, tough, space saving cover or fascia for both large appliances, such as kitchen appliances, and small portable devices, such as smart phones and media players.

A glass cover or fascia may be formed of a flat glass sheet, but may be formed of a curved or shaped glass sheet. A transparent or opaque glass fascia also enables decorative lighting effects by providing a light source under or adjacent to the glass sheet to illuminate or shine through the glass fascia. In some appliance applications, due to space or aesthetics constraints, it is not possible or desirable to locate a light source under the glass fascia or to one edge of the glass fascia in the plane of the glass sheet in alignment with the edge of the sheet. The present disclosure addresses how to couple light into a plane of a glass sheet, which may be an ion-exchanged glass sheet, when the input beam is not aligned with the plane of the glass sheet, e.g. is "out-of-plane."

FIG. 1a shows a planar ion-exchanged glass sheet 100 with an integrated out-of-plane light beam coupling. The planar ion-exchanged glass sheet 100 has a top ion-exchanged glass region 102, a core glass region 104 beneath the top ion-exchanged glass region 102, and a bottom ion-exchanged glass region 106 beneath the core glass region 104. Dotted lines 102a, 106a are used to visually separate the ion-exchanged glass regions 102, 106 from the core glass region 104. The terms "top" and "bottom" as used with the ion-exchanged glass regions 102, 106 are arbitrary, relative to the orientation of the drawing, and used for convenience. Here, the ion-exchanged regions 102, 106 are surface regions. Here, an ion-exchanged glass region has larger-radius diffused ions in sites formerly occupied by smaller-radius ions in the base glass that forms the glass sheet. The core glass region 104 is not an ion-exchanged region in that it does not contain any or a significant amount of the diffused ions that are characteristic of the ion-exchanged glass regions 102, 106 such that the core glass region substantially retains the composition of the base glass. In one embodiment, the base glass, and therefore the glass structure of each of the glass regions 102, 104, 106, contains alkali metal ions. In addition, at least some of the alkali metal ions in the ion-exchanged glass regions 102, 106 are larger-radius alkali metal ions that are not characteristic of the core glass region 104. Preferably, the larger-radius ions present in the ion-exchanged glass regions 102, 106 were diffused into the glass sheet in an amount sufficient to differentiate the ion-exchanged glass regions 102, 106 from the core glass region 104 and improve the overall strength of the planar ion-exchanged glass sheet 100. The differentiation can be in terms of glass structure, stress in the glass, and one or more optical properties.

In one embodiment, because the larger-radius diffused ions in the ion-exchanged glass regions 102, 106 occupy sites initially occupied smaller-radius ions in the base glass, while the core glass region retains all the smaller-radius ions and contains no larger-radius diffused ions, the ion-exchanged glass regions 102, 106 are compressively stressed or are in compression and the core glass region 104 is in tension or under tensile stress. Also, in one embodiment, the diffused ions in the ion-exchanged glass regions 102, 106 alter the refractive indices of these regions so that each of the ion-exchanged glass regions 102, 106 has a refractive index that is different from that of the core glass region 104. In one embodiment, the choice of diffused ions in the ion-exchanged glass regions 102, 106 is such that the refractive index of each of the ion-exchanged glass regions 102, 106 is higher than the refractive index of the core glass region 104. In another embodiment, the choice of diffused ions in the ion-exchanged glass regions 102, 106 is such that the refractive index of each of the ion-exchanged glass regions 102, 106 is lower than the refractive index of the core glass region 104. The refractive indices of the ion-exchanged glass regions 102, 106 may or may not be the same. The refractive index difference between the core glass region 104 and either one of the ion-exchanged glass regions 102, 106 may be up to 0.1, or even higher than 0.1 in some cases, e.g., if silver is used as the exchanging ion.

Despite the differences between the ion-exchanged glass regions 102, 106 and the core glass region 104 described in the preceding paragraphs, in one embodiment, the ion-exchanged glass regions 102, 106 and the core glass region 104 form a monolithic body, i.e., the ion-exchanged glass region 102 is monolithic with the core glass region 104 and the core glass region 104 is monolithic with the ion-exchanged glass region 106 thus forming a single contiguous sheet of glass. Here, a first region is monolithic with a second region if there is no seam or joint between the two regions. For this embodiment, the dotted lines 102a, 106a visually separating the ion-exchanged glass regions 102, 106, respectively, from the core region 104 in FIG. 1a and other figures do not represent seams or joints between these regions.

The glass regions 102, 104, 106 are planar and are parallel to a plane P of the planar ion-exchanged glass sheet 100. The plane P is drawn arbitrarily through the core glass region 104. However, the plane P could just as easily be drawn through either of the ion-exchanged glass regions 102, 106 or between the core glass region 104 and either of the ion-exchanged glass regions 102, 106. Each of the glass regions 102, 104, 106 has a thickness measured along a direction perpendicular to the plane P. Typically, the thickness or depth of layer of each of the ion-exchanged glass regions 102, 106 is in a range from 0.1 µm to 400 µm and the thickness of the core glass region 104 is in a range from 50 µm to 10 mm. Typically, the total thickness T of the planar ion-exchanged glass sheet 100, which in one embodiment is a combined thickness of the glass regions 102, 104, 106, is in a range from 50 µm to 10 mm, but may advantageously be a thin glass sheet having a total thickness of 2 mm or less, or 1.5 mm or less, 1 mm or less, or 0.7 mm or less.

Figure 1B:
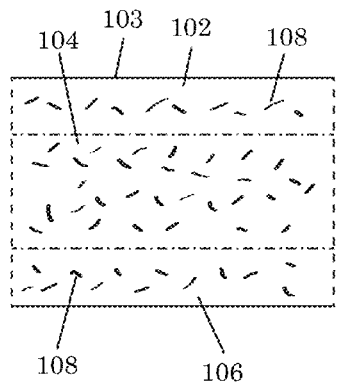
FIG. 1b is a cross-section of the of the planar ion-exchanged glass sheet of FIG. 1a illustrating embedded light scattering particles.
Figure 1C:
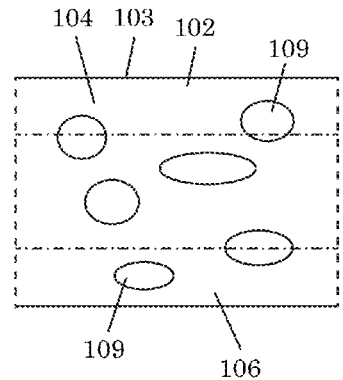
FIG. 1c is a cross-section of the planar ion-exchanged glass sheet of FIG. 1a illustrating embedded light scattering sites.

In one embodiment, light scattering particles 107 (in FIG. 1a) are dispersed or disposed on the surface 103 of the top ion-exchanged glass region 102. The index of refraction of the particles may be different than the index of refraction of the top ion-exchanged glass region in order to enhance the scattering effect. The light scattering particles 107 may be amorphous particles such as silica or doped-silica particles. Usually, these particles can be attached to the surface 103 via a binding agent, such as a polymer, or via a sol-gel coating. Alternatively, a light scattering texture may be disposed on the surface 103 of the top ion-exchanged glass region 102 in lieu of the light scattering particles, e.g., by roughening, abrading, etching, or otherwise texturing the surface 103. In one embodiment, light scattering particles 108 (in FIG. 1b) are dispersed or disposed within the volume of at least one of the glass regions 102, 104, 106. The light scattering particles 108 may be amorphous particles such as silica or doped-silica particles. In another embodiment, light scattering sites 109 (in FIG. 1c) are formed within the volume of at least one of the glass regions 102, 104, 106. The light scattering sites 109 may be in the form of optical property or geometrical shape contrasts within the volume. The light scattering sites 109 may include air voids, such as bubbles, or other forms of refractive index contrast or geometrical shape contrast that differs from a perfect flat surface. The surface texture, particles or scattering sites may have a depth/height or size/diameter greater than 50 nm, or in a range from about 50 nm to about 100 nm in order to scatter light in the visible spectrum.

The light scattering particles 107, 108 and light scattering sites 109 in their various positions and forms provide light scattering features that cause light coupled in the plane of the glass sheet 100 to diffuse and scatter across the planar ion-exchanged glass sheet 100 (arrows 123 & 125 in FIG. 3), such that a portion of the light (arrows 123) is emitted out through the surface 103 of the glass sheet. The glass sheet 100 is thereby illuminated and appears to shine or glow. The light scattering features, e.g. particles 107, 108 and/or light scattering sites 109, may be scattered substantially uniformly throughout the glass sheet 100 in order to substantially uniformly illuminate the entire glass sheet 100 when light is coupled in the edge of the glass sheet 100. Alternatively, the light scattering features 107, 108 and 109 may be located in select regions in order to generate an illuminated decorative pattern, such as picture, theme or design, on the surface of the glass sheet 100 when light is coupled in the edge of the glass sheet 100. The decorative pattern may be or include a brand name, trademark or logo, or a message.

Figure 2:
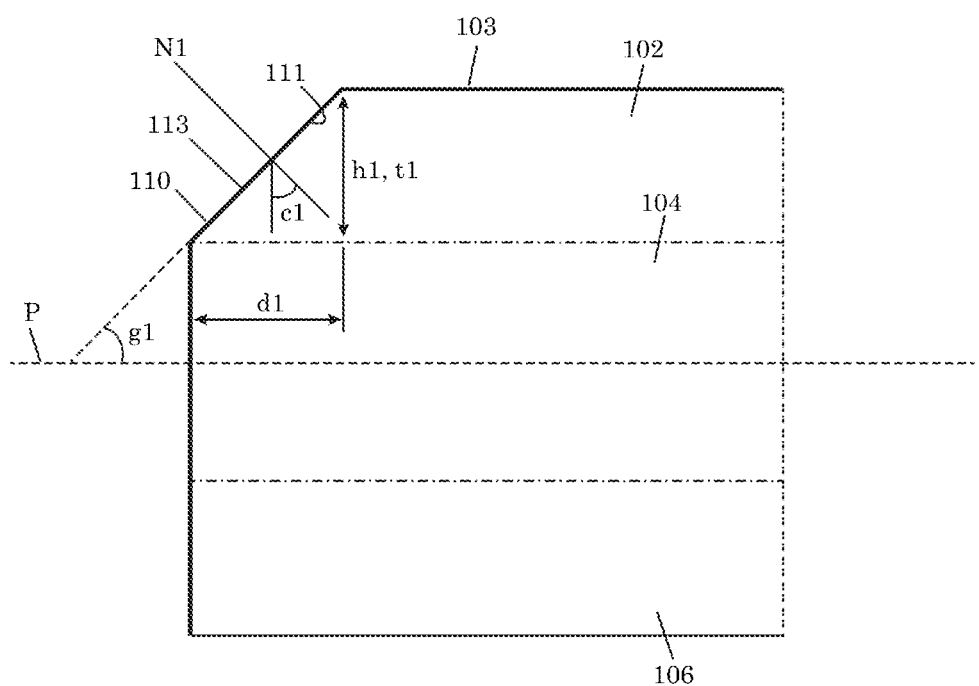
FIG. 2 is a side view of the planar ion-exchanged glass sheet of FIG. 1a illustrating various properties of the angled end face.
Figure 3:
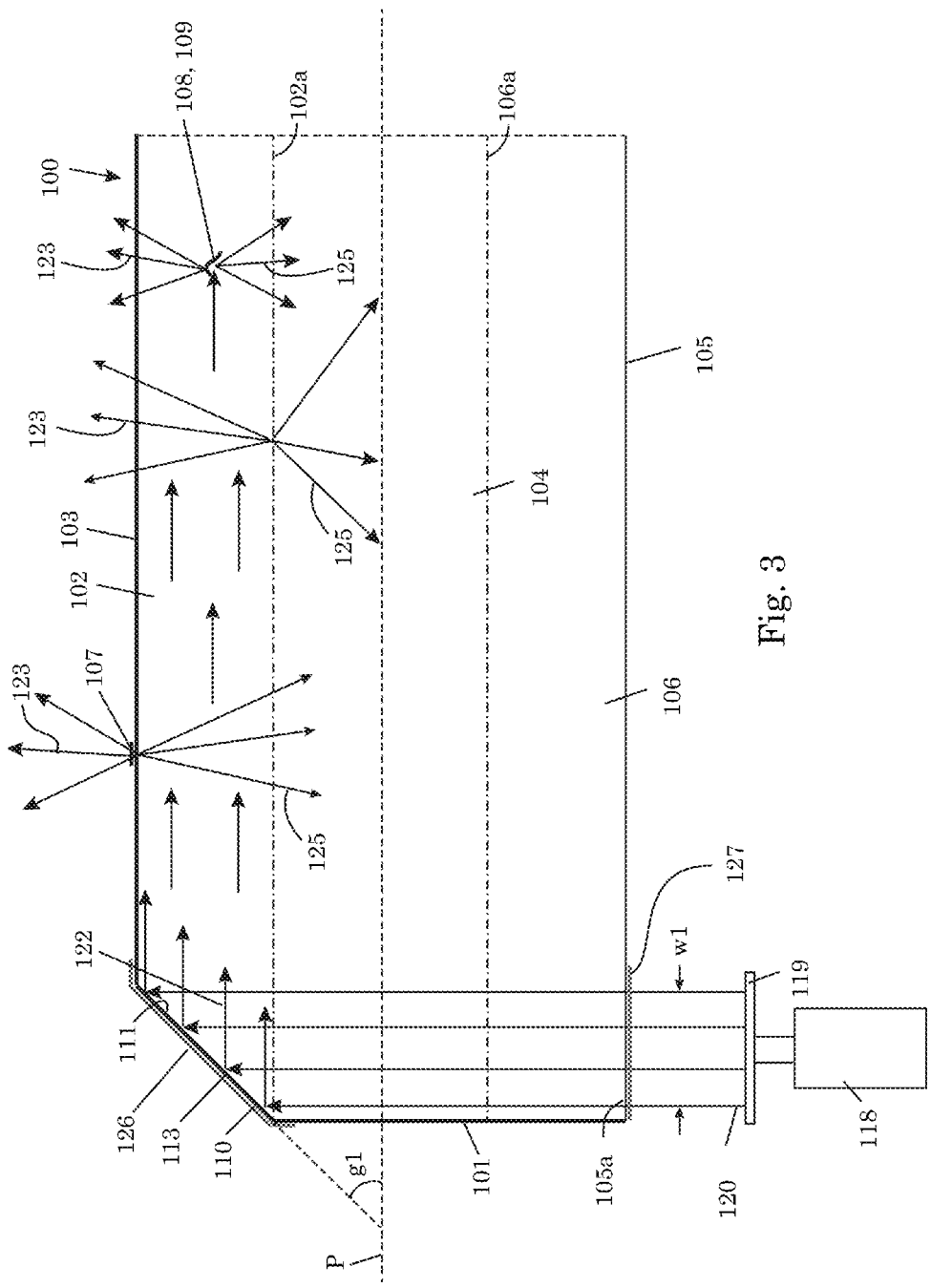
FIG. 3 is a side view of the planar ion-exchanged glass sheet of FIG. 1a illustrating coupling of an out-of-plane light beam into the glass sheet.

In one embodiment, the top ion-exchanged glass region 102 has an angled end face 110 at an edge 101 of the planar ion-exchanged glass sheet 100. In one embodiment, the angled end face 110 is monolithic with the top ion-exchanged glass region 102 (FIGS. 1a, 2 and 3). The angled end face 110 is for coupling an out-of-plane light beam into the planar ion-exchanged glass sheet 100. In one embodiment, the angled end face 110 is a flat surface. The edge 101 including the angled end face 110 may be made of planar surfaces or a combination of planar and curved surfaces.

In FIG. 2, the angled end face 110 has a glass-side 111 facing the interior of the planar ion-exchanged glass sheet 100 and an air-side 113 facing the exterior of the planar ion-exchanged glass sheet 100. The angled end face 110 is inclined to the plane P of the planar ion-exchanged glass sheet 100 by a glass angle g1. The term "glass" used with angle means that the angle is measured through the glass. In one embodiment, the glass angle g1 is acute. Preferably, the glass angle g1 is acute and at least equal to a critical angle c1 at the angled end face 110. More preferably, the glass angle g1 is acute and greater than the critical angle at the angled end face 110. The critical angle c1 at the angled end face 110 is measured relative to a normal N1 to the angled end face 110 and is the angle of incidence above which total internal reflection would occur at the angled end face 110. The critical angle c1 is the arc sine of n0/n1, where n0 is the refractive index of the medium at the air-side 113 of the angled end face 110 and n1 is the refractive index of the medium at the glass-side 111 of the angled end face 110. The medium at the air-side 113 of the angled end face 110 may be air, but may be another gas or a frame or encapsulating material that encapsulates the edges of the glass sheet. The medium at the glass-side 111 of the angled end face 110 would be the top ion-exchanged glass region 102. In one embodiment, n0 is the refractive index of air and n1 is the refractive index of the top ion-exchanged glass region 102. The angled end face 110 has a glass height h1, which in one embodiment is the same as the thickness t1 of the top ion-exchanged glass region 102. The angled end face 110 also has a glass depth d1 given by t1/tan(g1). For any given glass height h1, the glass angle g1 or glass depth d1 can be appropriately selected to optimize the coupling efficiency of the angled end face 110.

In FIG. 3, an elongate or linear light source 118, e.g., a fluorescent tube, a linear array of laser devices, a linear array of LED devices, or a linear array of optical fibers coupled to a laser device or LED device by a beam splitter, is positioned adjacent to, parallel to, and below the bottom surface 105 and adjacent to the edge 101 of the glass sheet 100 (e.g. out-of-plane) where the angled end face 110 is located. The light source 118 is positioned in opposing relation to the glass-side 111 of the angled end face 110 in order to direct an out-of-plane elongate light beam or linear array of light beams (the input beam 120) toward and through the planar ion-exchanged glass sheet 100 to the glass-side 111 of the angled end face 110. The input beam(s) 120 can be emitted in a direction substantially perpendicular to the plane P of the planar ion-exchanged glass sheet 100. The out-of-plane light beam 120 can be polarized or non-polarized and can be in any of the ultraviolet, visible, near-infrared, and infrared wavelength ranges. An optical element 119, such as a linear array of micro lenses or an elongate lens, may be positioned between the light source 118 and the planar ion-exchanged glass sheet 100 to modify the profile of the out-of-plane light beam 120 to one that would be more efficiently coupled into the planar ion-exchanged glass sheet 100 through the angled end face 110, e.g., the optical element 119 may be used to produce a collimated beam. The out-of-plane light beam 120 may be a linear array of a plurality of point beams arranged along the width W (see W in FIG. 1a) of the planar ion-exchanged glass sheet 100. Alternatively, the out-of-plane light beam may be an elongate line beam extending along the width W of the planar ion-exchanged glass sheet 100. A linear array of a plurality of light beams may also be provided by a single light source 118 via a beam splitter.

The out-of-plane light beam 120 enters the planar ion-exchanged glass sheet 100 through surface portion 105a at the bottom surface 105 of the glass sheet 100, travels through the ion-exchanged glass region 106 and core glass region 104, and then strikes the surface 111 of the angled end face 110 to produce a reflected light beam(s) 122. The reflected light beam 122 is an in-plane beam (relative to the plane P of the glass sheet 100) that is aligned for entry into the top ion-exchanged glass region 102. As the reflected light beam 122 travels along the top ion-exchanged glass region, it strikes the light scattering features (particles 107 or 108 and/or light scattering sites 109), the top surface 103 of the glass sheet, and the glass-glass boundary 102b between the top ion-exchanged glass region 102 and the core glass region 104. Portions of the reflected light beam 122 passing through the surface 103 that strike the light scattering features 107, 108 109 are scattered (arrows 123 & 125 in FIG. 3) such that at least a portion 123 of the reflected light beam 122 is emitted out of the top surface 103 of the glass sheet 100 (and the top ion-exchanged glass region 102). Another portion 125 of the reflected light beam 122 is scattered into the core glass region 104. The light beam scattered into the core glass region 104 may be reflected into the ion-exchanged glass regions 102, 106. However, if the refractive index of the core glass region 104 is selected to be higher than that of the top ion-exchanged glass region 102 and the bottom ion-exchanged glass region 106, the light beams 125 scattered into the core glass region 104 may be confined within and guided along the core glass region 104. Some of the light beams 125 will be reflected by one of (a) the boundary 106a between the core glass region 104 and bottom ion exchanged region 106 and (b) the bottom surface 105 of the glass sheet 100 back toward and out of the top surface 103 of the glass sheet. A reflective coating (not shown) may be provided on the bottom surface 105 of the glass sheet to reflect a substantial portion of the light beams 125 back toward and out of the top surface 103 of the glass sheet and thereby enhance the brightness or power of the illumination of the top surface 103 of the glass sheet.

A number of measures may be taken to maximize the coupling efficiency of the angled end face 110 and thereby maximize the brightness of the light emitted out the top surface 103 of the glass sheet 100. One of the measures is to set the glass angle g1 to be greater than the critical angle c1. With this setting, total internal reflection should theoretically occur at the angled end face 110 so that the out-of-plane light beam 120 striking the angled end face 110 is completely reflected into the planar ion-exchanged glass sheet 100 so that more of the out-of-plane light beam 120 is reflected and coupled into the top ion-exchanged glass region 102 as the reflected light beam 122. Because of material imperfections, it is likely that some of the out-of-plane light beam 120 striking the angled end face 110 would escape to the air-side 113 of the angled end face 110 or be scattered to areas outside the glass sheet. To curb the optical power loss through the angled end face 110, and thereby allow more of the optical power to be coupled into the top ion-exchanged glass region 102, a reflective coating 126 may be applied on the air-side 113 of the angled end face 110. An anti-reflective coating 127 may be applied at the input area 105a of the glass sheet to avoid the first initial reflection of the out-of-plane light beam 120 (this initial reflection is usually 4% for a glass-air interface, which would also make available more of the optical power to be coupled into the top ion-exchanged glass region 102 and emitted out the top surface 103 of the glass sheet. The coupling efficiency could also be improved by matching the width w1 of the out-of-plane light beam 120 to the depth d1 of the angled end face 110 (see d1 in FIG. 2). The width w1 may be 0.05 to 10 times the depth d1 of the angled end face 110, but the width w1 will ultimately also be a function of the spot size of the light source being used.

Figure 4:
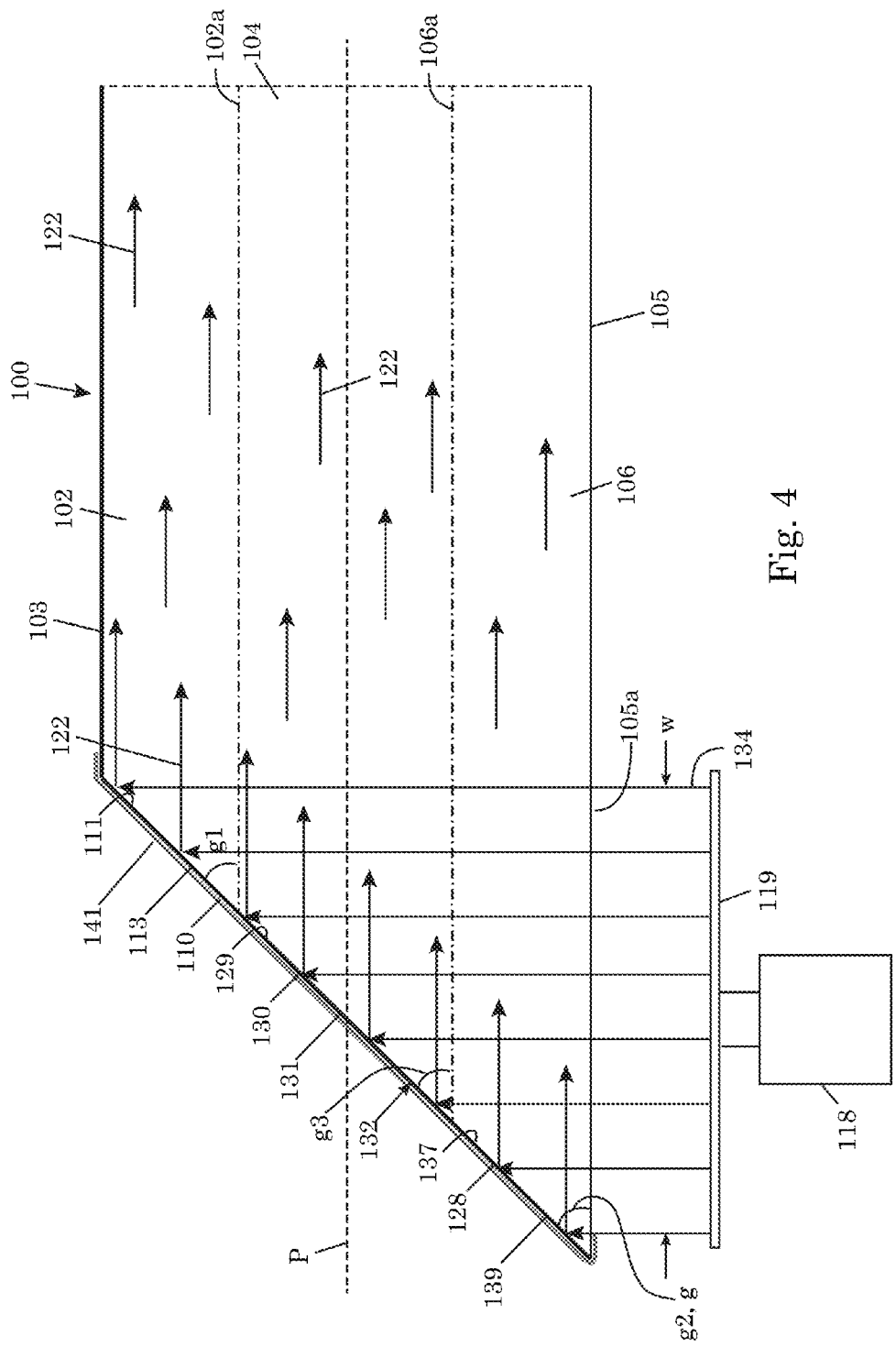
FIG. 4 is a side view of a planar ion-exchanged glass sheet having an angled end face for coupling an out-of-plane light beam into the glass sheet.

In a manner similar to the top ion-exchanged glass region 102, the core glass region 104 and bottom ion-exchanged glass region 106 could also have angled end faces. In FIG. 4, the bottom ion-exchanged glass region 106 has a monolithic angled end face 128, which is inclined to the plane P of the planar ion-exchanged glass sheet by a glass angle g2. In one embodiment, the angle g2 is acute and greater than the critical angle at the angled end face 128. In this case, the critical angle at the angled end face 128 is the arc sine of n0/n2, where n0 is the refractive index of the medium at the air-side 139 of the angled end face 128 and n2 is the refractive index of the medium at the glass-side 137 of the angled end face 128. The medium at the air-side 139 of the angled end face 128 may be air. The medium at the glass-side 137 of the angled end face 128 would be the bottom ion-exchanged glass region 106. In other words, n0 could be the refractive index of air and n2 is the refractive index of the bottom ion-exchanged glass region 106. In a manner similar to the angled end face 110, the angled end face 128 couples an out-of-plane light beam into the bottom ion-exchanged glass region 106.

In one embodiment, the core glass region 104 also has an angled end face 130, which is inclined to the plane P of the planar ion-exchanged glass sheet 100 by a glass angle g3. In one embodiment, g3 is acute and greater than the critical angle at the angled end face 130. In this case, the critical angle at the angled end face 130 is the arc sine of n0/n3, where n0 is the refractive index of the medium at the air-side 131 of the angled end face 130 and n3 is the refractive index of the medium at the glass-side 129 of the angled end face 130. The medium at the air-side 131 of the angled end face 130 may be air. The medium at the glass-side 129 of the angled end face 130 would be the core glass region 104. In other words, n0 could be the refractive index of air and n3 is the refractive index of the core glass region 104. In a manner similar to the angled end face 110, the angled end face 130 couples an out-of-plane light beam into the core glass region 104.

In one embodiment, the angled end faces 110, 128, and 130 are contiguous and aligned so that they form a single (continuous) angled end face 132 that extends across the entire cross-section (or thickness) of the planar ion-exchanged glass sheet 100. Alternatively, the angled end faces 110 and 128 may extend across only the top ion-exchanged region 102 and the core glass region 104 (not shown). The angled end face 132 is inclined to the plane P of the planar ion-exchanged glass sheet 100 by a glass angle g, where 90 degrees<g<maximum of (arc sine n0/n1, arc sine n0/n2, arc sine n0/n3), where n0, n1, n2, and n3 are as defined above. Different portions of the angled end face 132 couple different portions of the out-of-plane light beam 134 into the regions 102, 104, 106 in the same manner described above with reference to FIG. 3. For guiding through the core glass region 104, the refractive index of each of the ion-exchanged glass regions 102, 106 may be selected to be lower than that of the core glass region 104 so that light scattered into the core glass region 104 from the ion-exchanged glass regions 102, 106 stays within the core glass region 104. The out-of-plane light beam 134 may be provided as a single light beam wide enough to strike the angled end face 132 at locations adjacent to all the regions 102, 104, and 106 or as a plurality of light beams. In the latter case, each of the plurality of light beams may be targeted for coupling to one of the regions 102, 104, 106. The measures described above for maximizing or improving coupling efficiency for the angled end face 110 may also be applied to the angled end face 132. For example, the angled end face 132 could be coated with a reflective material 141. Also, the width w of the out-of-plane light beam 134 should be appropriately selected based on the depth of the angled end face 132 and the desired coupling efficiency and alignment tolerance (that is, tolerance of alignment between the light source 118 and the surface portion 105a through which the light beam enters the planar ion-exchanged glass sheet 100).

Figure 5:
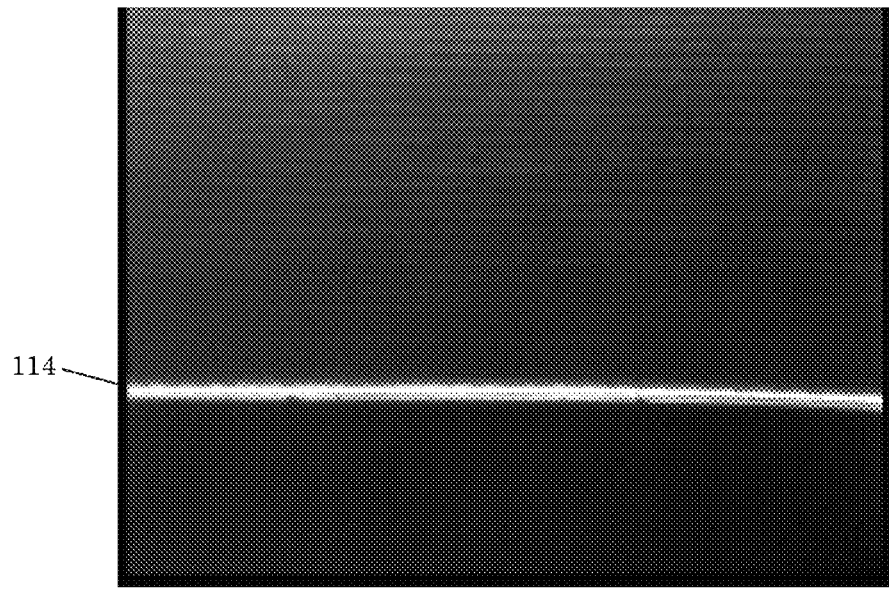
FIG. 5 is a digitized image of coupling of an out-of-plane light beam into a planar ion-exchanged glass sheet via an angled end face of the planar ion-exchanged glass sheet.

An experiment was carried out to demonstrate the viability of optical coupling into a planar ion-exchanged glass sheet via an angled end face of an ion-exchanged glass region having a glass angle of 45 degrees. The experiment was carried out using the device of FIG. 3. The critical angle at the angled end face 110 was roughly 41.5 degrees. The angled end face 110 had a glass depth d1 of 100 microns, which together with a glass angle of 45 degrees would yield a glass height h1 of 100 microns. The ion-diffusion depth of layer of the ion-exchanged glass region was 51.6 microns. In this experiment, the glass sheet did not include any light scattering particles 107, 108 or light scattering sites 109 and an out-of-plane light beam having a width of 300 microns was used. A laser emitting at 1550 nm was used to launch the out-of-plane light beam into the glass sheet. The output from the glass sheet was detected by an infrared camera. FIG. 5 shows a digitized image of the results of the experiment. The bright region 114 shows the light beam coupled into the glass sheet via the angled end face of the ion-exchanged glass region.

Figure 6:
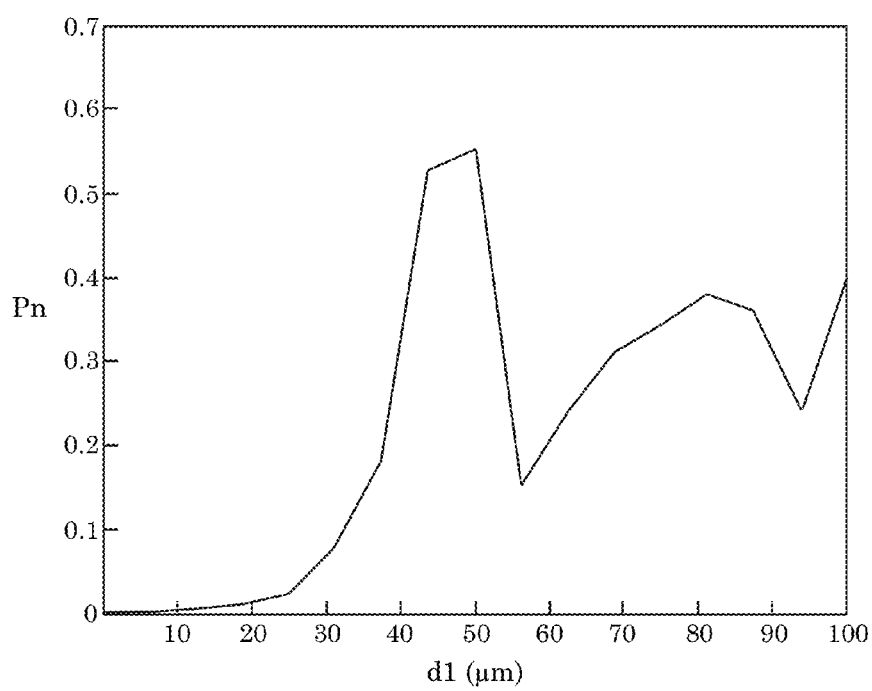
FIG. 6 is a plot of power coupled into an ion-exchanged glass region as a function of glass depth of an angled end face of the ion-exchanged glass region.

A first simulation was carried out to investigate the effect of glass depth d1 of the angled end face 110, which is related to glass angle g1 and depth h1, t1 of the top ion-exchanged region 102, on optical coupling into a first ion-exchanged glass region via an angled end face. In this simulation, the glass sheet did not include any light scattering particles 107, 108 or light scattering sites 109 and an out-of-plane light beam having a width of 300 microns was used. The thickness of the ion-exchanged glass region having the angled end face was 25 microns, which is 1/12th of the width of the out-of-plane light beam. The brightness or power of the reflected light 122 was monitored by a CCD camera 153 and a calibrated power meter and the brightness or power of the non-reflected light was monitored by a CCD camera 149 and a calibrated power meter (see FIG. 8). FIG. 6 is a plot of the brightness or power (Pn) of the reflected light 122 coupled into the ion-exchanged glass region having the angled end face as a function of glass depth d1 (see d1 in FIG. 2). The power shown in FIG. 6 has been normalized. This shows the power or amount of light that was effectively coupled into the glass sheet and is available to be scattered to illuminate the top surface 103 of the glass sheet upon the addition of light scattering particles 107, 108 or light scattering sites 109 in the glass sheet. Although not shown in the plot, very little or no power was coupled into the core glass region and bottom ion-exchanged glass region, i.e., the regions not having angled end faces. The power coupled has a nonlinear relationship with glass depth. The observed multiple power peaks in FIG. 6 may be due to interferences from multiple reflections and multimode coupling in the glass sheet.

Figure 7:
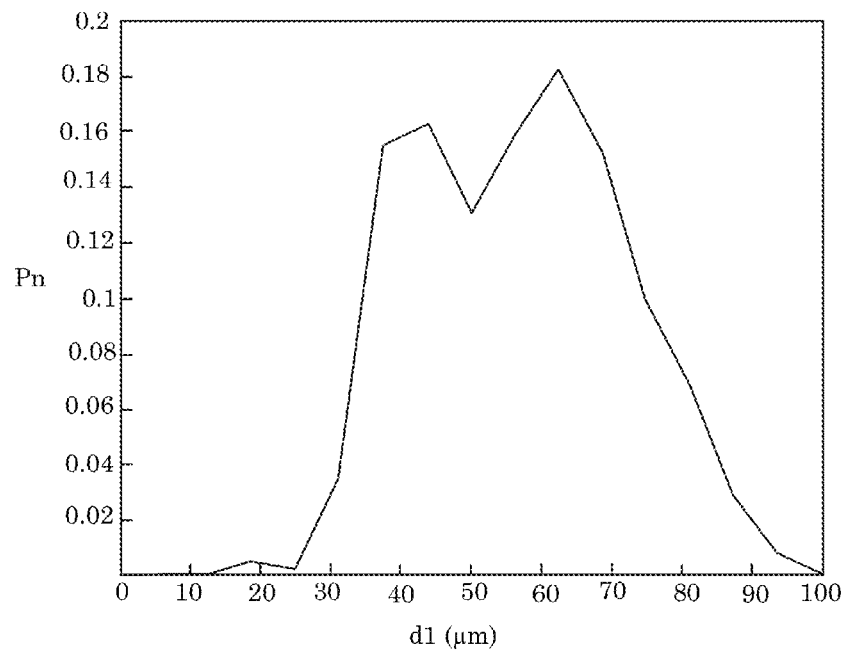
FIG. 7 is another plot of power coupled into an ion-exchanged glass region as a function of glass depth of an angled end face of the ion-exchanged glass region.

A second simulation was carried out generally as described in the first simulation, except that an out-of-plane light beam having a width of 50 microns was used. FIG. 7 is a plot of the brightness or power of the reflected light 122 coupled into the ion-exchanged glass region having the angled end face as a function of glass depth d1. The power shown in FIG. 6 has been normalized. As in the previous simulation, very little or no power was coupled into the core glass region and the second ion-exchanged glass region that do not have the angled end faces. The power coupled has a nonlinear relationship with glass depth as in the first simulation. The observed multiple power peaks in FIG. 7 may be due to interferences from multiple reflections and multimode coupling in the glass sheet.

Figure 8:
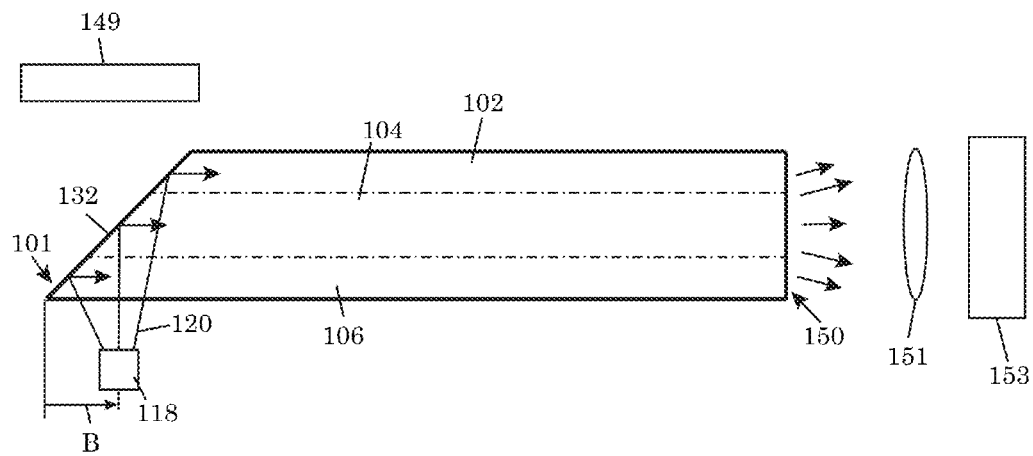
FIG. 8 is a setup for coupling an out-of-plane light beam into a planar ion-exchanged glass sheet using an angled end face extending across the whole cross-section of the glass sheet.
Figure 9:
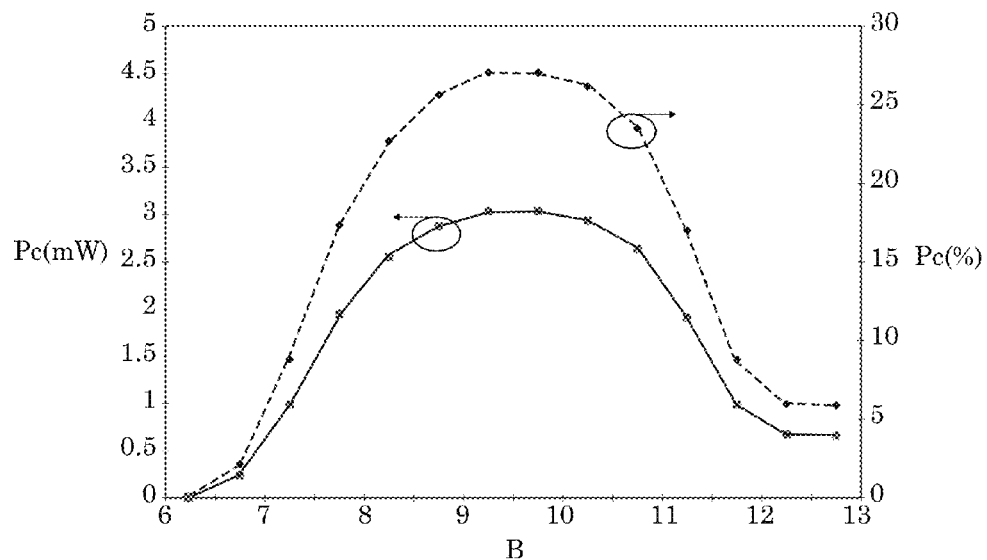
FIG. 9 is a plot of power coupled into or scattered by a planar ion-exchanged glass sheet having an angled end face for optical coupling as a function of light source position.

An experiment was carried out to demonstrate the viability of optical coupling into the whole cross-section of the glass sheet using an angled end face that extends across the whole cross-section of the glass sheet. The setup is shown in FIG. 8. The angled end face 132 had a glass angle of 45 degrees. In this experiment, the glass sheet did not include any light scattering particles 107, 108 or light scattering sites 109 and an out-of-plane light beam having a width of 300 microns was used. A LED device was used as the light source 118 to generate the out-of-plane light beam 120 having a width of 3 mm and numerical aperture of 15 degrees. The input light beam was launched into the glass sheet as shown in FIG. 8. The brightness or power of the light transmitted through the glass sheet, i.e., the light not reflected and coupled into the glass sheet, was measured with a CDD camera 149 and calibrated power meter. The brightness or power of the light 122 reflected and coupled into the glass sheet (and therefore available for being scattered and illuminating the top surface 103 of the glass sheet) was measured with a CDD camera 153 and calibrated power meter. The position of the light source 118 relative to the near edge 101 of the glass sheet was varied during the measurement, as indicated by the arrow B. Estimates of the power of the light coupled into the glass sheet were made from the power of the out-of-plane light beam and the measured power transmitted through the glass sheet. FIG. 9 shows a plot of the brightness or power of the light coupled into the glass sheet (Pc) as a function of light source position (B) (solid line in FIG. 9). The percentage of the input power coupled into the glass sheet (and available to be scattered for illuminating the glass sheet) as a function of power of the light source position is also shown in FIG. 9 (dashed line in FIG. 9). The relationship between the power coupled into the glass sheet and light source position is nonlinear. However, there is a noticeable range of light source positions where the power coupled into the glass sheet is maximized. FIG. 9 shows that at the optimum light source position about 25% of the input power was coupled into the glass sheet. For some light source positions where there is little or no coupling, it may be that the LED is misaligned with the glass sheet such that there is virtually no light being reflected from the angled end face.

Figure 10:
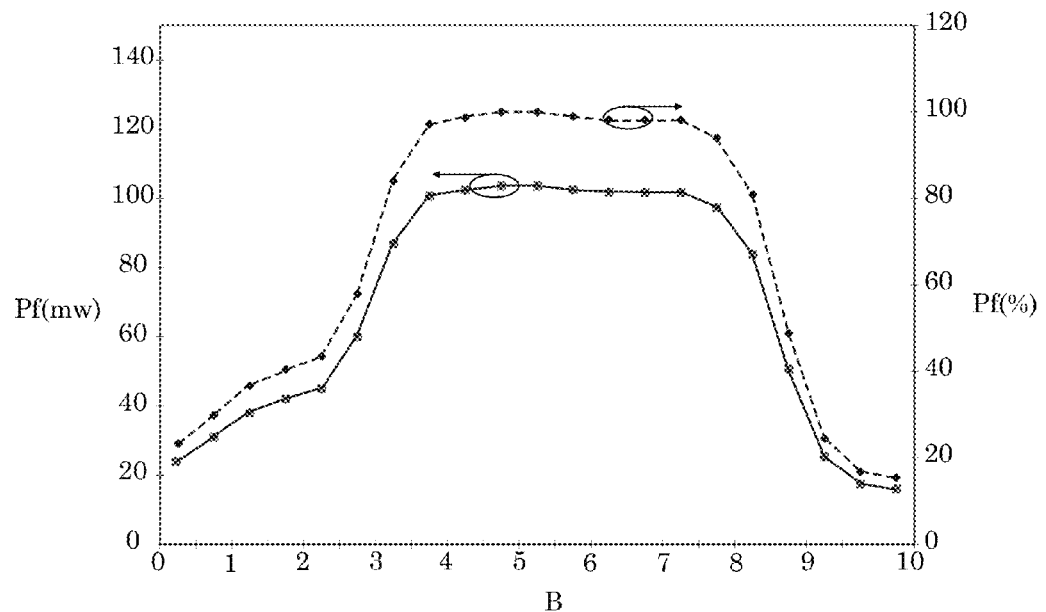
FIG. 10 is a plot of far-field power radiating from a far end of a planar ion-exchanged glass sheet having an angled end face for optical coupling as a function of light source position.

For the same parameters used in the experiment whose results are plotted in FIG. 9 and the setup shown in FIG. 8, the brightness or power of the light 122 reflected and coupled into the glass sheet was measured at a distance from the far edge 150 of the glass sheet using a UV lens 151 focused around the center position of the glass sheet and a CCD camera 153 and calibrated power meter. As in the previous experiment, the light source position B relative to the near edge 101 of the glass sheet was varied during the measurement. The UV lens 151 only made a partial collection of all the power radiated from the far end surface 150 of the glass sheet. FIG. 10 shows a plot of the partial far-field power (Pf) (solid line) versus light source position (B). Also shown in FIG. 10 is a plot of the partial far-field power as a percentage of the input power versus light source position (dashed line). FIG. 9 shows that light is radiated from the far edge 150 of the glass sheet for all the light source positions considered, i.e., even when power does not appear to be coupled into the glass sheet (see FIG. 8 for light source positions where power was not coupled into the glass sheet). This suggests that some of the light collected far-field may be due to scattering of the light on the glass surfaces 103, 105 and the glass region interfaces 102*a* and 106*a*.

In one embodiment, a method of making the planar ion-exchanged glass sheet 100 includes providing a flat sheet of glass. The glass sheet 100 may be formed from a chemically strengthened glass sheet, such as Corning® Gorilla™ glass. The glass sheet may be relatively thin. By thin or relatively thin, it is meant that the glass sheet has a thickness of about 2 mm or less, 1.5 mm or less, 1 mm or less, 0.7 mm or less, 0.5 mm to 1.5 mm, or 0.5 mm to 1 mm. Use of such thin glass sheets to form a fascia or cover enables the bending of the glass sheet to form curvatures having a radii of curvatures that are much smaller than is achievable with relatively thick glass sheets, such as 3.2 mm thick soda lime glass sheets. Relatively small radii of curvature 10 mm or less or 5 mm or less may be desirable for providing relatively sharp corners on the fascia or cover for a crisp clean ornamental appearance on an electronic or other device. The Gorilla glass has a relatively deep depth of layer (DOL) of compressive stress, and presents a relatively high flexural strength, scratch resistance and impact resistance. As shown by ball drop test data, 1 mm thick Gorilla glass sheet has a comparable impact resistance in ball drop with 3.2 mm thick tempered Soda Lime glass sheet. The advantage of Gorilla glass enables the possibility of a tough, thin, lighter weight glass panel for household appliances and other relatively large devices such as architectural objects and features, as well as a tough, space saving, lighter weight skin for small portable devices. In addition, the relatively thin Gorilla glass sheet presents superior capacitive touch function sensitivity, which enables a better integration of any kind of display and other control touch panel into the front surface of the device.

The glass sheet may be alkali-containing glass. Examples of suitable glass compositions are disclosed in U.S. patent application Ser. Nos. 11/888,213, 12/277,573, 12/392,577, 12/393,241, and 12/537,393, all assigned to Corning Incorporated, the contents of which are incorporated herein by reference in their entirety. Example ion-exchangeable glasses that are suitable for forming glass sheet are alkali-aluminosilicate glasses or alkali-aluminoborosilicate glasses, though other glass compositions are contemplated. As used herein, "ion exchangeable" means that a glass is capable of exchanging cations located at or near the surface of the glass with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O+Na_2O+K_2O$)≤18 mol. % and 2 mol. %≤($MgO+CaO$)≤7 mol. %.

In a particular embodiment, an alkali-aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali-aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali-aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. %≤$Li_2O+Na_2O+K_2O$≤20 mol. % and 0 mol. %≤$MgO+CaO$≤10 mol. %.

In still another embodiment, an alkali-aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤$MgO+CaO+SrO$≤8 mol. %; ($Na_2O+B_2O_3$)–$Al_2O_3$≤2 mol. %; 2 mol. %≤$Na_2O$–$Al_2O_3$≤6 mol. %; and 4 mol. %≤($Na_2O+K_2O$)–$Al_2O_3$≤10 mol. %.

The glass, in some embodiments, is batched with 0-2 mol. % of at least one fining agent selected from a group that includes $Na_2SO_4$, NaCl, NaF, NaBr, $K_2SO_4$, KCl, KF, KBr, and $SnO_2$.

The flat or shaped glass sheet is subjected to an ion-exchange process, where a portion of the smaller-radius alkali metal ions in the glass structure is exchanged for larger-radius alkali-metal ions. The ion-exchange process occurs at an elevated temperature range that does not exceed the transition temperature of the glass. The glass sheet is dipped into a molten bath comprising a salt of an alkali metal, the alkali metal of the salt having an ionic radius that is larger than that of the alkali metal ions contained in the glass. In the bath, the smaller alkali metal ions in the glass are exchanged for the larger alkali metal ions of the salt. At and near the surface of the glass sheet subjected to the ion-exchange process, the larger ions would reside in sites formerly occupied by the smaller ions, which would create a compressive stress in that region of the glass sheet. The glass sheet is cooled down following the ion-exchange. The ion-diffusion depth of the ion-exchange is controlled by the glass composition and the time period and temperature for the ion-exchange. In the case where the glass sheet is bent or shaped, the glass sheet is bent or shaped to the desired shape prior to the ion exchange process.

In lieu of subjecting the flat or shaped glass sheet to an ion-exchange process, the method of making the planar ion-exchanged glass sheet 100 may also start with a flat or shaped glass sheet having ion-exchanged glass regions. One example of such a glass is GORILLA glass from Corning Incorporated.

Next, an edge of the flat or shaped glass sheet that has been subjected to an ion-exchange process is cleaved to create an angled end face. The cleaving process may also take place prior to the ion exchange process. The angled end face may extend across a thickness of a single ion-exchanged region (as shown in FIG. 3) or may extend across the total thickness of the glass sheet (as shown in FIG. 4), or across a single ion-exchanged region and the core region (not shown). It is also possible to cleave the end of the flat glass sheet to form the angled end face at the edge of the flat glass sheet prior to subjecting the flat glass sheet to the ion-exchange process. The cleaved surface may be polished to enhance its reflectivity.

In one embodiment, a reflective material is applied on the angled end face and in surface portions of the glass sheet surrounding the angled end face. The reflective material may be in the form of a conductive paint reflector, conductive thin-films, metallic film, or stacked dielectric thin-films.

In another embodiment, an anti-reflective material that can be a coating, a roughening or texturing of the surface of the glass sheet, or a multi-region dielectric stack is applied on the flat input facet of the glass sheet where the source is located (i.e., at surface portions 105a in FIGS. 3 and 4), and it is the first interface between the source and the glass sheet. The anti-reflective material can be used to increase the amount of light coupling into the glass sheet and avoid the first initial reflection of the light at the interface of the glass where the input beam first enters into the glass (this initial reflection is usually 4% for a glass-air interface).

A light scattering material 107 may be applied on the surface of the flat glass sheet to aid in scattering the light beam coupled into the glass sheet such that a portion of the light coupled into the glass sheet is emitted out the surface of the glass sheet, thereby illuminating the glass sheet. The scattering material may be in the form of particles disposed on the surface of the glass sheet. The index of refraction of the light scattering material may be different than the index of refraction of the top ion-exchanged glass region in order to enhance the scattering effect. The scattering material may be an amorphous particulate such as silica or doped silica particles. Usually, these particles can be disposed on the surface of the glass sheet via a binding agent such as a polymer or via a sol-gel coating. Alternatively, the surface of the glass sheet may be roughened or textured using any suitable process, such as etching, sand blasting or abrading. Alternatively, a light scattering material or structure may be embedded within the volume or region of the flat glass sheet into which the light beam is coupled. The embedded scattering material or structure may be in the form of particles, air voids, fine bubbles, or other form of refractive index contrast or geometrical shape contrast that differs from a perfect flat surface.

The light scattering material or structures may be scattered substantially uniformly throughout the glass sheet in order to substantially uniformly illuminate the entire glass sheet when light is coupled in the edge of the glass sheet. Alternatively, the light scattering material or structures may be located only in, or may be more concentrated in select regions of the glass sheet in order to generate an illuminated decorative pattern, such as a picture, theme or design on the surface of the glass sheet when light is coupled in the edge of the glass sheet. The decorative pattern may be co-extensive with the entire glass sheet or only may be located in select regions of the glass sheet. The decorative pattern may be or include a brand name, slogan, warning, trademark, logo, or provide an operational message, information or warning that is either constantly or selectively illuminated at certain times as desired or needed. For example, the glass sheet may only be illuminated when a device is on or when an appliance door is open, closed or touched. Also, a warning, for example, a message that a freezer or refrigeration compartment is too warm, is not closed, a battery needs to be charged, or a water filter needs to be replaced, may be illuminated in a highly visible red color. The decorative pattern may also include indications for a touch control panel located under the glass sheet, such as keys/buttons and labels.

The light source may extend along and illuminate the entire length of the edge 101 of the glass sheet. Alternatively, the light source may only extend along a select portion(s) of the edge of the glass sheet that corresponds to select region(s) of the glass sheet containing a decorative pattern of light scattering material or structures. The light source may be of any desired color and may vary in color upon demand, or automatically over time. For example, the color of the light source may be changed upon demand, e.g., manually, or automatically upon the occurrence of an event, such as a malfunction of the appliance or device, a special occasion such as an anniversary or birthday, nightfall, daylight, change of season, opening, locking, or closing of a door, touching the device, or a compartment reaching a desired or undesired temperature, or may display an interior temperature or other operational parameter of the device. Different portions of the light source may be of different colors in order to illuminate different portions of the decorative pattern in different colors. For example, a decorative picture may be illuminated in a pleasant blue, while a warning, for example, a message that a freezer or refrigerator is too warm or a water filter needs to be replaced, may be illuminated in a highly visible red color.

FIG. 11 schematically illustrates (not to scale) one technique for mounting an edge to edge decorative flat glass cover or fascia 145 on a refrigerator door 150. However, it will be appreciated that the glass sheet may be employed as a glass cover or fascia for any type of an electronic device, such as portable devices (e.g. smart phones, MP3 players, etc.), televisions and other smart appliances (e.g. ovens, microwaves, dishwashers, etc.). The glass sheet may also form a protective or decorative cover on other devices or objects, such as furniture or an architectural feature, such as a counter, cabinet, wall, column, elevator wall or elevator control panel.

As previously described herein, a glass cover or fascia of all embodiments hereof may includes a sheet of relatively thin chemically strengthened glass sheet 100, such as Corning Gorilla glass. Due to the relatively thin flexible nature of such a glass sheet, it may be advantageous to support substantially the entire rear or inner surface of the fascia to inhibit flexing of the glass sheet upon impact or load forces. According to one aspect of the present disclosure, this is accomplished by providing an optional layer of backer material 152 (the backer or backer sheet) having mechanical properties suitable to support the relatively thin glass sheet 100 and inhibit the localized deformation of the glass sheet under impact or loading forces that may cause the glass sheet to fracture. The backer sheet may be adhered to the inner surface of the glass sheet or to the outer surface of the device under the glass sheet.

According to one embodiment hereof, support rails 154 and 156, which may be made of steel or other suitable material, may be adhered to the inner surface of the glass sheet 100 (or the inner surface of the optional backer sheet 152 as illustrated) with any suitable adhesive material 162, 164, such as double-sided adhesive tape, such as 3M VHB adhesive tape, or double-sided adhesive foam. Each support rail may have one or more clips or hooks 172, 174, or other releasable fastening device, in order to enable the quick reliable attachment and detachment of the support rails to the devices 150. The clips or hooks may be inserted through the slots in the front of the device 150. With this construction, the glass sheet may be easily detached and re-attached for repair or replacement of the glass sheet due to damage or when remodeling, etc.

The backer 152 may be somewhat smaller in width than the width of the glass sheet 100, so as to allow two support rails to be bonded directly to outer side edge portions of the inner surface of the fascia. However, it may be advantageous for the backer sheet to extend substantially completely between the opposing side edges and substantially completely between the top and bottom edges of the glass sheet in order to support the entire rear surface of the glass sheet. The backer sheet 152 may also extend slightly beyond one or more of the edges of the glass sheet 100 as illustrated in FIG. 11, in order to protect the edges of the glass sheet from impacts. The outer edges of the backer sheet 152 may optionally be formed with a step or ledge that wraps around or frames the edges of the glass sheet (not shown). A front or outer surface of the step may be flush with the outer surface of the glass sheet (not shown), in order to provide an appealing smooth flush front surface of the fascia. Alternatively, the step may wrap over the front or outer surface of the glass sheet of the fascia, such that the glass sheet is securely retained by the backer sheet (not shown).

The external surfaces of many devices are not perfectly planar, e.g. they are non-planar. For example, devices such as refrigerator doors 150 are typically formed of thin sheet metal outer panel and are filled with expanding insulating foam. The expanding insulating foam tends to cause the outer panel 150 to bow outwardly as illustrated in FIG. 11. When a reflective fascia/front panel, such as a glass cover or fascia as described herein, is employed on a device, it may be desirable that the fascia remain substantially flat or planar so that images reflected by the fascia do not appear to be distorted. Distorted reflections may create an impression of a low quality assembly. With the previously described backer sheet 152, the glass sheet 100 is supported by the backer sheet such that the glass sheet is maintained substantially flat/planar.

The backer sheet 152 may be attached to the inner surface of the glass sheet 100 by bonding the entire outer surface of the backer sheet to the inner surface of the glass sheet or just by bonding select portion of the backer sheet to the glass sheet. This bond can be achieved using a pressure-sensitive adhesive material, such as Scapa's UP2040 50 micron thick acrylic adhesive. Such an adhesive can laminate the backer sheet to the glass sheet using a pressure-roll laminator, an autoclave, or other methods. Alternative adhesives that maybe employed include thermoplastic adhesives, such as thermoplastic urethane (TPU) or ethylene vinyl-acetate (EVA), which would require autoclaving or a heated pressure-roll laminator to sufficiently heat the adhesive and cause it to bond the backer sheet to the glass sheet. Alternatively, the thin glass fascia may be pressed against the curved surface of the device and deformed to conform to the shape of the surface of the device and held in place by the mounting rails, adhesive, or other frame or clip members.

The backer sheet 152 is made of a relatively stiff or rigid material such that it prevents localized areas of the glass sheet from deflecting into the fascia. The backer sheet may have a modulus of elasticity of about 2.0 GPa or more. The backer material may be formed of, by way of example only, polycarbonate (PC), acrylonitrile butadiene styrene (ABS), acrylic, or nylon. The backer sheet may also be formed of glass or ceramic filled polymers. Fiberglass, carbon fiber, other composite stack-ups, ceramics and metals, such as stainless steel, aluminum, copper or brass, may also be used as a backer material. The backer material may be molded onto, sprayed onto, or preformed and bonded onto the glass sheet. The backer sheet 152 may be a polycarbonate sheet with a thickness of about 1.5 mm.

In the case of a stainless steel backer material, a stainless steel outer skin of an appliance may form the backer material. In such a case, the glass cover or fascia may be adhered directly to the outer surface of a stainless steel appliance to provide scratch and dent resistance and ease of cleaning. The backer sheet 152 may also be formed of a laminated structure in which a hard material with a modulus of elasticity of about 2.0 GPa or more is laminated to an underlying energy absorbing material having a lower modulus of elasticity. The energy absorbing material may be located on the front or outer surface of the hard material, e.g. between the hard material and the glass sheet, or on the back or inner surface of the hard material.

Figure 13:
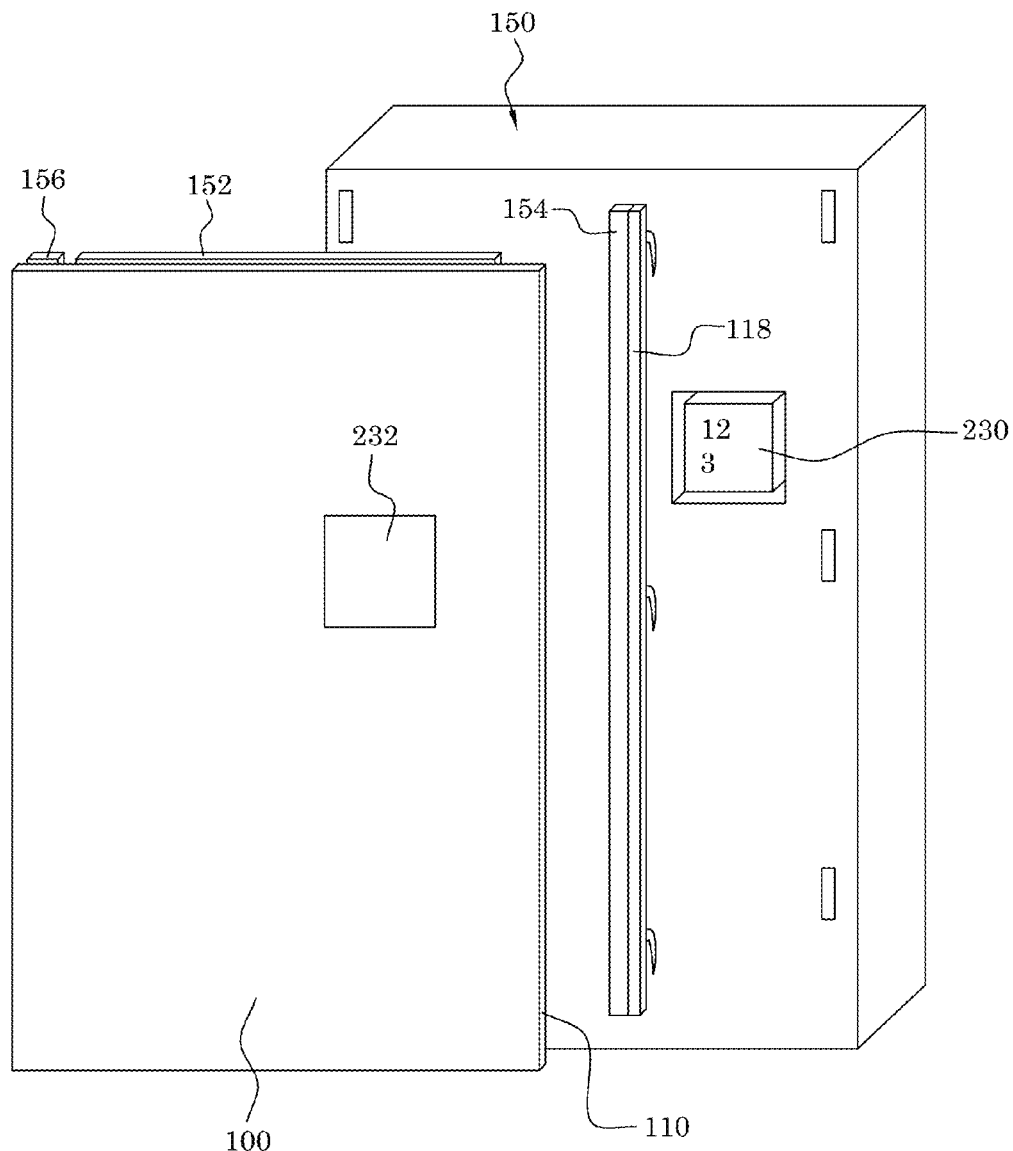
FIG. 13 is a partially exploded perspective view of a light coupled glass sheet, mounting rails and an appliance according another aspect hereof.

According to another embodiment hereof as schematically illustrated in FIG. 13 seamless incorporation of a display and/or control panel 230 into the front or top of a device may be accomplished by mounting such a display and/or control panel between the glass fascia and the front of the device. A display and/or touch control panel, such as a capacitive touch LCD control panel, may be mounted to the outer surface of the device. A display or control panel 230 may be mounted to the exterior of the appliance's structural members, or in a cavity formed in the fort of the device as illustrated in FIG. 12. The display or control panel may alternatively be bonded to the inner surface of the glass sheet.

The display of control panel may be mounted such that the front of the display or control panel is closely adjacent to the inner surface of the glass sheet (e.g. within a distance D of about 5 mm or less from the inner/rear surface of the fascia). Such an arrangement that closely mounts the display or control panel closely adjacent to a relatively thin a glass sheet fascia according to all embodiments hereof can substantially eliminate the "tunnel effect" when viewing the display that is created when a thicker glass sheet is employed as a cover sheet or fascia. The display or touch control panel may be connected to the appliance and to a CPU through a standard connector that provides the required DC operating voltage and communication signals between the display and the appliance controller.

As previously described above, the light coupling arrangement described herein allows the light source 118 to be positioned below (or behind) the glass sheet where the angled end face 110 is located, thereby eliminating the need for a thick frame or other structure to one side of the glass sheet for housing the light source as illustrated in FIGS. 11 and 13. This enables a frameless glass fascia, or a glass fascia with a very thin frame or encapsulation to be illuminated from behind. Very clean, edge-to-edge, frameless illuminated glass fascia designs are thus enabled. As illustrated in FIG. 13, an elongate light source 118 may be attached to, located adjacent to or incorporated into one of the mounting rails 154.

The rear or inner surface of the glass sheet 100 may be coated or laminated with a decorative layer, such a layer of ink, frit or other material (not shown), to provide a desired color, pattern, image, or other appearance effect to the fascia. An area 232 of the sheet over a display or control panel 230 may remain uncoated by decoration or a backer sheet, so that this portion of the fascia is transparent for viewing the display or control panel. The 152 sheet may be cut away in this portion in order to allow the display or control panel to be visible there through and be located as close to the inner surface of the glass sheet as possible. Optionally, the glass sheet may be coated to provide a controlled transparency, variable transparency, or one way mirror effect, such that the display or control panel is only visible when activated or illuminated.

An embodiment of a shaped glass sheet or fascia 20 according the present disclosure is diagrammatically illustrated in 12. In some aspects hereof, the glass sheet may be shaped, such as by molding, bending or sagging, such that it has a generally planar central front portion, and rearward extending side portions. The central and side portions of the glass sheet may be substantially flat/planar in configuration. However, select portions of the glass fascia may optionally have a desired ornamental or useful shape or configuration, such as a 2-D or 3-D bow or other more complex shape (not shown). With rearward extending side portions, the light source 118 and the light coupling edge 110 of the glass sheet may be located near a rear corner or side of the device 150, or even behind a front panel or door 150 of the device.

The backer sheet 152 supporting a shaped glass sheet may be a single continuous sheet of backer material that is adhere to and covers substantially the entire rear surface of the glass sheet 22. The backer sheet may initially be a flat sheet of material that is adhered to or laminated to a flat glass sheet. The glass-backer laminated structure may then be bent into one of the shapes as illustrated in FIG. 12. Alternatively, the backer sheet may be segmented, with a separate flat sheet of backer material being adhered to each segment of the glass sheet. The backer sheet 152 may also be separately bent into one of the desired shapes as illustrated in FIG. 12 and then laminated to a glass sheet 100 that has already been bent to the corresponding shape.

The glass fascia 100 may have a width and height that is approximately equal to or somewhat larger than the width and height of the device 150. Although, the width of the fascia may alternatively only be a fraction of the width or height of the device, such that glass sheet only covers a portion of the front of the device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A glass sheet comprising:
a top surface and a bottom surface;
a first ion-exchanged glass region adjacent to the top surface of the glass sheet;
a second ion-exchanged glass region adjacent to the bottom surface of the glass sheet;
a core glass region intermediate the first and second ion-exchanged glass regions;
scattering features at least one of dispersed within the glass sheet and dispersed on the top surface of the glass sheet; and
an angled end face inclined to the top surface and extended across a thickness of at least one of the glass regions.

2. The glass sheet of claim 1, wherein a refractive index of each of the first and second ion-exchanged glass regions is different from a refractive index of the core glass region.

3. The glass sheet of claim 1, wherein each of the first and second ion-exchanged glass regions is in compression and the core glass region is in tension, and the glass sheet has a thickness of about 2 mm or less, 1.5 mm or less, 1 mm or less, or 0.7 mm or less.

4. The glass sheet of claim 1, wherein the angled end face includes an inclined inner reflecting surface.

5. The glass sheet of claim 1, further comprising an anti-reflective layer formed on a surface of at least one of the first and second ion-exchanged glass regions in a position where the anti-reflective layer is in opposing relation to the angled end face.

6. The glass sheet of claim 1, further comprising a reflective layer formed on the second surface.

7. The glass sheet of claim 1, wherein the light scattering particles are located or concentrated in select regions of the glass sheet, whereby when a light beam is coupled into the glass sheet a decorative pattern is illuminated on an exposed surface of the glass sheet.

8. A glass sheet of claim 1, wherein portions of the glass sheet are non-planar.

9. An illuminated glass fascia on an object comprising:
a glass sheet having a top surface and a bottom surface;
a first ion-exchanged glass region adjacent to the top surface of the glass sheet;
a second ion-exchanged glass region adjacent to the bottom surface of the glass sheet;
a core glass region intermediate the first and second ion-exchanged glass regions;
scattering features at least one of dispersed within the glass sheet and dispersed on the top surface of the glass sheet;
an angled end face inclined to the top surface, extended across a thickness of at least one of the glass regions, and having an inclined inner reflecting surface; and
a light source positioned to emit a light beam that passes through at least one of the glass regions and strikes the reflecting surface to produce a reflected light beam coupled into at least one of the glass regions and then scattered by the scattering features to illuminate the top surface of the glass sheet.

10. The glass fascia of claim 9, wherein the scattering particles are more concentrated in select regions of the glass sheet than in other areas of the glass sheet, whereby a decorative pattern is illuminate on the top surface of the glass sheet.

11. The glass fascia of claim 9, wherein the light source includes a plurality of light sources, includes a plurality of colored light sources, includes one or more colored light beams that change color in response to an event.

12. The glass fascia of claim 9, wherein the glass fascia is mounted on a front or top surface of an electronic device.

13. The glass fascia of claim 9, wherein the glass fascia is mounted on the front of a door of an appliance.

14. The glass fascia of claim 9, wherein the glass sheet has a thickness of about 2 mm or less, 1.5 mm or less, 1 mm or less, or 0.7 mm or less.

15. The glass fascia of claim 9, wherein portions of the glass sheet are non-planar.

16. The glass fascia of claim 9, wherein a refractive index of each of the first and second ion-exchanged glass regions is different from a refractive index of the core glass region, and each of the first and second ion-exchanged glass regions is in compression and the core glass region is in tension.

17. The glass fascia of claim 9, wherein a glass angle between the angled end face and a plane of the glass sheet is such that the angled end face extends across a thickness of at least the one of (a) the first ion-exchanged glass region, (b) the second ion-exchanged glass region, and (c) the core glass region, and wherein a glass angle between the angled end face and the plane is less than 90 degrees and greater than at least one of the arc sine of $n0/n1$, where $n0$ is the refractive index of air and $n1$ is the refractive index of a corresponding one of (a) the first ion-exchanged glass region, (b) the second ion-exchanged glass region, and (c) the core glass region.

* * * * *